Oct. 20, 1970  P. NASH  3,535,535
INSPECTION AND SORTING OF SHEET MATERIALS BY PHOTOELECTRIC MEANS
Filed Sept. 25, 1967

United States Patent Office 3,535,535
Patented Oct. 20, 1970

3,535,535
INSPECTION AND SORTING OF SHEET MATERIALS BY PHOTOELECTRIC MEANS
Paul Nash, P.O. Box 6040, Station J,
Ottawa, Ontario, Canada
Filed Sept. 25, 1967, Ser. No. 670,329
Claims priority, application Canada, Oct. 3, 1966,
972,003
Int. Cl. G01n 21/30
U.S. Cl. 250—219                                    9 Claims

ABSTRACT OF THE DISCLOSURE

Blemishes, such as holes and elevations in a sheet material which in an unblemished state has spaced apart apertures therein are detected by directing a beam of light at an actue angle onto the sheet material and detecting the light transmitted through the sheet material by a photoelectric sensor. The angle between the beam of light and the sheet material is chosen such that optimal sensitivity and a large signal to noise ratio is obtained.

---

This invention relates to new and useful improvements in light sensitive photoelectric inspection apparatus for the detection of holes, lumps and creases in sheet materials which may be travelling at high speed. In particular, it relates to photoelectric inspection apparatus using an ultraviolet light source such as was described in my copending patent application, Ser. No. 580,495, filed on Sept. 19, 1966.

In my said copending application an inspection apparatus was described consisting of an inspection head unit, an ultraviolet lamp source, means for supporting moving sheet material between said detection head and lamp at any speed up to 6000 feet per minute, speeds which may occur during the production and processing of sheet materials such as paper, plastics, wire cloth and textile cloths. This detection apparatus served primarily for the inspection of holes in the material. Using selective filtering within a sharp band of radiation in the ultraviolet range of light, substantially all materials inspected exhibited true opacity and ambient light effects were minimized by making the system only sensitive to a very narrow band in the ultra-violet range and by using a differential amplifying system attached to interleaved photocells feeding separate amplifiers.

It was found, however, that certain sheet materials such as thin tissues, wire cloth made of transparent or semitransparent plastics or metal and textiles could not be inspected with a good signal to noise ratio when the requirement for detection of small holes was essential, because such materials exhibited a very large number of small diameter holes even when the materials were without blemish. In order to make the inspection system economical and in order to give plenty of space between the inspection head system the material and the lamp housing, photocells were positioned across the web approximately 10 inches apart. This meant that each photocell viewed a web area which, under optimum conditions, was of the same order of magnitude in the direction of motion as the diameter of the smallest holes to be detected. The width of web viewed by each photocell was of the order of 12 to 15 inches allowing for overlap between individual cell optics. This meant, for example, that on certain filter papers to be inspected one cell optics viewed some 20,000, .005 inch diameter holes, because the nature of the material was in approximation similar to a checkerboard pattern of .005 inch diameter holes spaced on .010 inch centres in each dimension. This meant that an area viewed by the cell of, say, 0.125 inch x 15 inches (i.e., an area of 1.87 inch square) represented "a hole" of approximately 1 inch square, whereas it was essential to detect a single hole of 0.125 inch in diameter representing only an area of the order of one-hundredth of an inch square.

According to this invention detection of such small holes in semitransparent materials, semitransparent by the nature of the weave or filter material, can be reliably detected with a good signal noise ratio by illuminating and viewing the sheet material at a shallow angle equal or less than a well defined critical angle, by using light in a very narrow solid angle in the direction of sheet flow, if possible approximating parallel light. The critical angle is defined as the angle between the central beam of light or axis of symmetry of the light beam and the plane of the sheet material when sheet material of finite thickness blocks transmission of light through the many small openings of the sheet material (e.g. the weave) but does not block the light through the larger diameter defective holes or imperforations in the material.

A further feature of this invention is that creases and lumps in the material can also be detected by the system since such imperforations also effect the said critical angle.

Further features and advantages of the system will become apparent through the following description of a preferred embodiment of my method of inspection illustrated in connection with the accompanying drawings in which.

Figure 1:
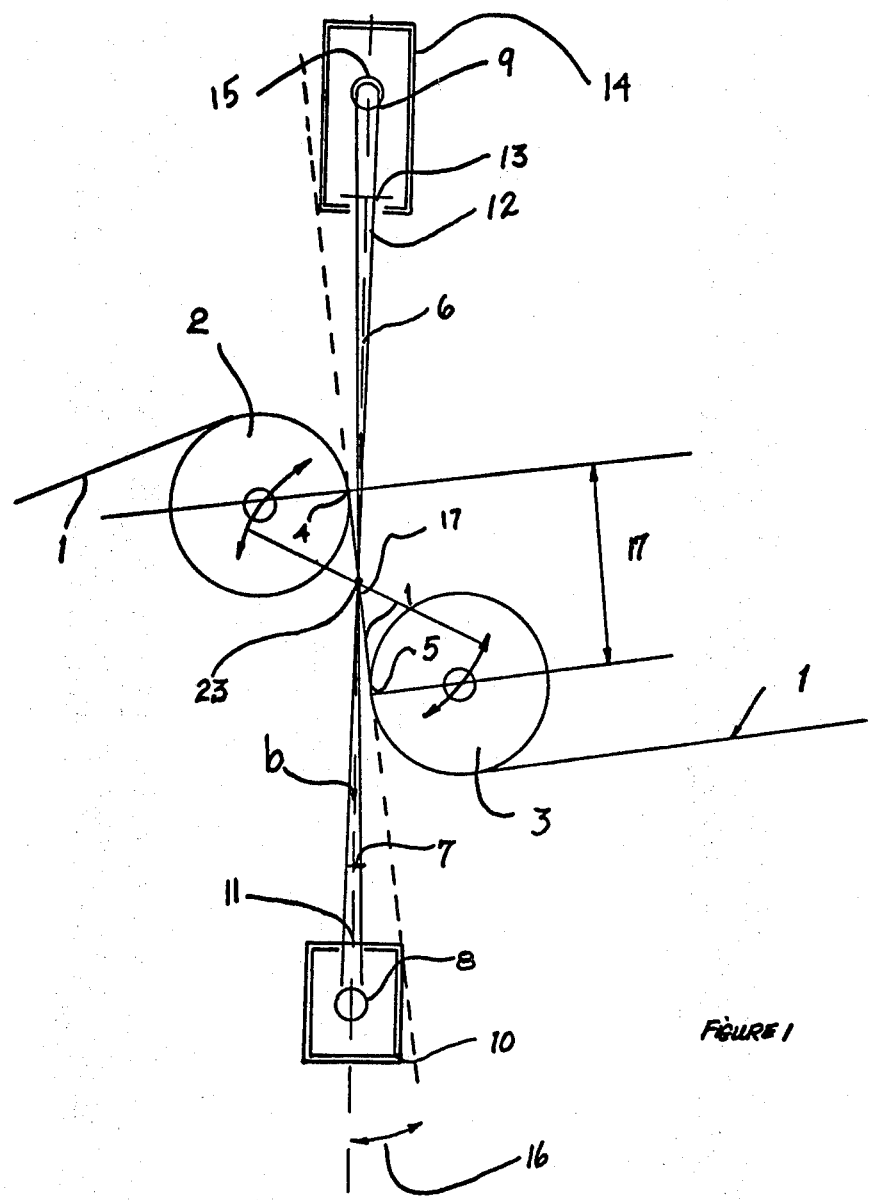
FIG. 1 is a view in the cross section of an inspection system.

In FIG. 1, sheet material 1 is shown passing over roller 2 and under roller 3. These rollers have parallel axes and the sheet material is under sufficient tension to make the unsupported section of the web between the contact lines 4 and 5 taut, so that all the sheet between contact lines 4 and 5 lies in a flat plane however wide the sheet material may be. Naturally, it is conceivable to make this plane curved but in this case the lamp and head system must be correspondingly adapted in a similar fashion, which is undesirable.

Rollers 2 and 3 are so arranged that the taut flat paper section between the tangential contact lines 4 and 5 is a quarter of an inch to several inches long in the direction of paper motion. A light beam 7 radiated by a lamp 8, preferably has it axis of symmetry 6 passing through the centre of this taut paper section and is received by a photocell 9. Lamp 8 is contained in housing 10 provided with an elongated aperture 11 through which the beam of light floods the web section between contact lines 4 and 5. Only a small part of this beam can passs through a hole in the flooded web section and the solid angle of the beam in the direction of web flow is thus made quite small so that the beam enters through aperture 12 and ultra-violet filter 13 in housing 14 of the photocell 9. Photocell 9 could conveniently be one of the cells in a head unit as shown in FIGS. 1, 2 and 3 of the aforementioned Canadian application No. 941,277.

The active part of beam 7 actuating the photo cathode 15 of photo electric cell 9 is indeed a very narrow beam. For example, in an experimental arrangement the aperture 11 had a width of the order of 1 inch and a length greater than the width of the paper web and the aperture 12 of the inspection head was of the same order of magnitude as aperture 11. The distance of the approximately half-inch wide photo cathode from aperture 12 was approximately 5 inches, the distance between lamp 8 and aperture 11 was approximately 3 inches and the distance between apertures 11 and 12 was 13 inches. Ideal conditions for the purposes of this invention are suitably formed by a cylindrical lens system associated with lamp 8 such that the light beam between apertures 11 and 12 is a truly parallel beam in planes extending in the direction of paper motion. In the transverse dimension i.e. at right angles to paper motion, the optical angles need not be limited in any way.

When beam 7 consists of such a parallel beam there is an angle 16, which is conveniently called the "critical angle" such that, in the absence of abnormal holes, none of the parallel beams forming light beam 7 will pass through web 1 and enter housing 14 of the inspection head. This critical angle 16 is formed by a plane through web section 17 and a plane through beam axis 6.

Figure 2:
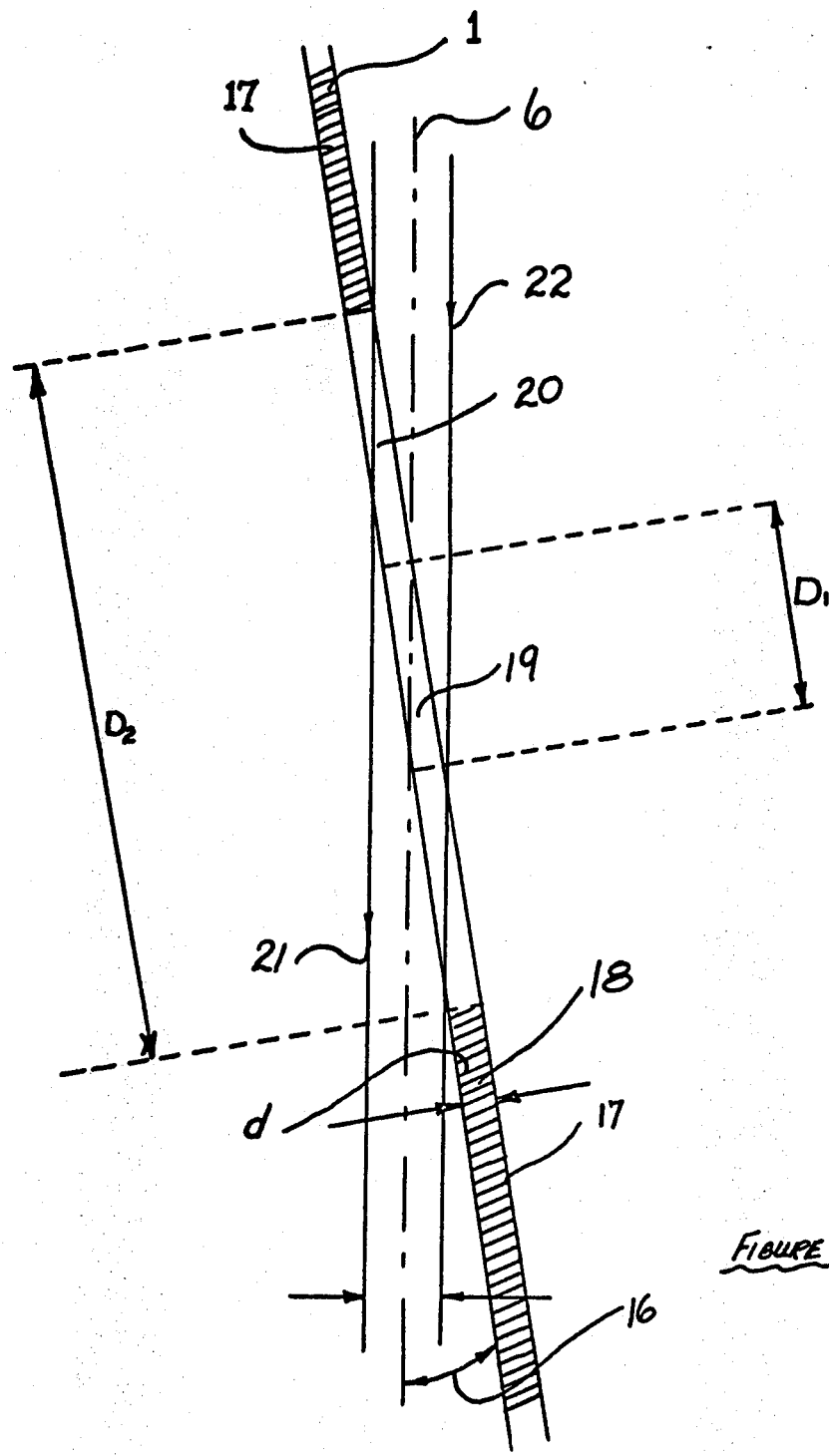
FIG. 2 is a view in cross section of the sheet material and light beam forming a critical angle for optimum sensitivity and signal to noise ratio.
Figure 3:
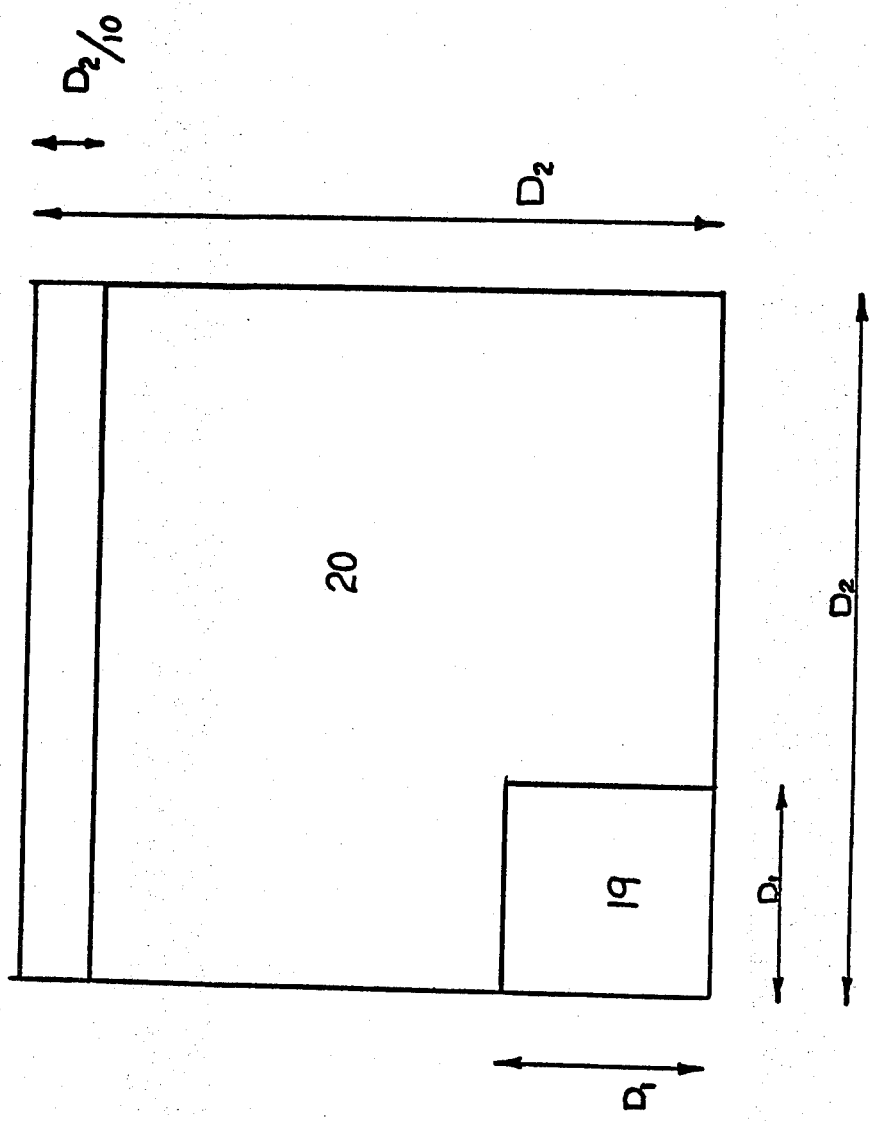
FIG. 3 is a diagram explaining the effect of the critical angle on "zeroing" the natural minute holes and only reducing by a fixed proportion the defective larger holes.

The meaning and significance of the critical angle 16 is further explained in FIG. 2. A portion 18 of section 17 of sheet material 1 has a thickness (d). A natural minute hole 19, e.g. the weave of the unblemished sheet material 1, is shown in FIG. 2 having a diameter D1. A larger hole 20, representing a blemish, has the diameter D2. Any number of holes 19 must not be detected by the device, while any larger hole having diameter D2 shall be detected by the device.

Parallel lines 6, 21 and 22 represent parallel light beams. Light beams 6, 21 and 22 form only a part of all the parallel beams flooding the inspected section 17 of sheet material 1, radiated from lamp 8 and received by photocell 9.

It will be noted that light beam 21 and 22 cannot pass through larger hole 20, these beams are blocked by the sheet material. All light beams parallel to and lying between beams 21 and 22 will however pass through hole 20, but will not pass through minute hole 19 as long as solid sheet material surrounds hole 19. It should be noted that light beam 6 on the axis of the overall beam 7 is on the border of a "go, no-go" defined by the critical angle 16; i.e., beam 6 and all other beams parallel to it forming components of beam 7 are fully blocked by the sheet material containing any number of minute holes with diameters equal or less than that of hole 19, as long as solid matter, however thin, separates such holes.

It will also be apparent that the thickness (d) of the sheet material will much influence the critical angle. For example, when the thickness of the sheet material equals 2d the angle 16 can be considerably increased, then the amount of light transmitted through large hole 20 will correspondingly increase and therefore the sensitivity of the inspection system for holes will also increase. This means that the greater can be made the critical angle as function of the thickness of the sheet material, the smaller is the diameter of the abnormal hole which can be reliably detected.

It also follows from the above considerations that when the thickness of the sheet material is very thin the critical angle becomes quite sharp and the sensitivity of the system has to suffer.

Tests were conducted on very lightweight tissue papers used for the manufacture of teabags, for filters and casings with an approximate thickness of .001 inch. It was found that typical largest holes in the unblemished material were of the order of .006 inch in diameter. FIG. 2 presents this particular case. It was found that the critcial angle for such very thin tissues is of the order of 10 degrees and that it is quite practical to detect one hole with a diameter of .020 inch.

For simplicity of presentation, let holes 19 and 20 be square holes, as shown in FIG. 3. It will be seen that the area of hole 19 is approximately one-tenth of the area of hole 20.

$$D1^2 = 36 \; 10^{-6} \text{ inch}^2$$
$$D2^2 = 400 \; 10^{-6} \text{ inch}^2$$

The amount of light transmitted through the holes is proportional to the projection of the hole areas in the direction of the light beam. The projection of hole 19 is zero. The projection of hole 20 is:

$$D2 \times D2/10 = D2^2/10 = 40 \; 10^{-6} \text{ inch}^2$$

This means that the effective area for light transmission of hole 20 was reduced by a factor of 10, while the effective area of hole 19 disappeared for light transmission.

Figure 4:
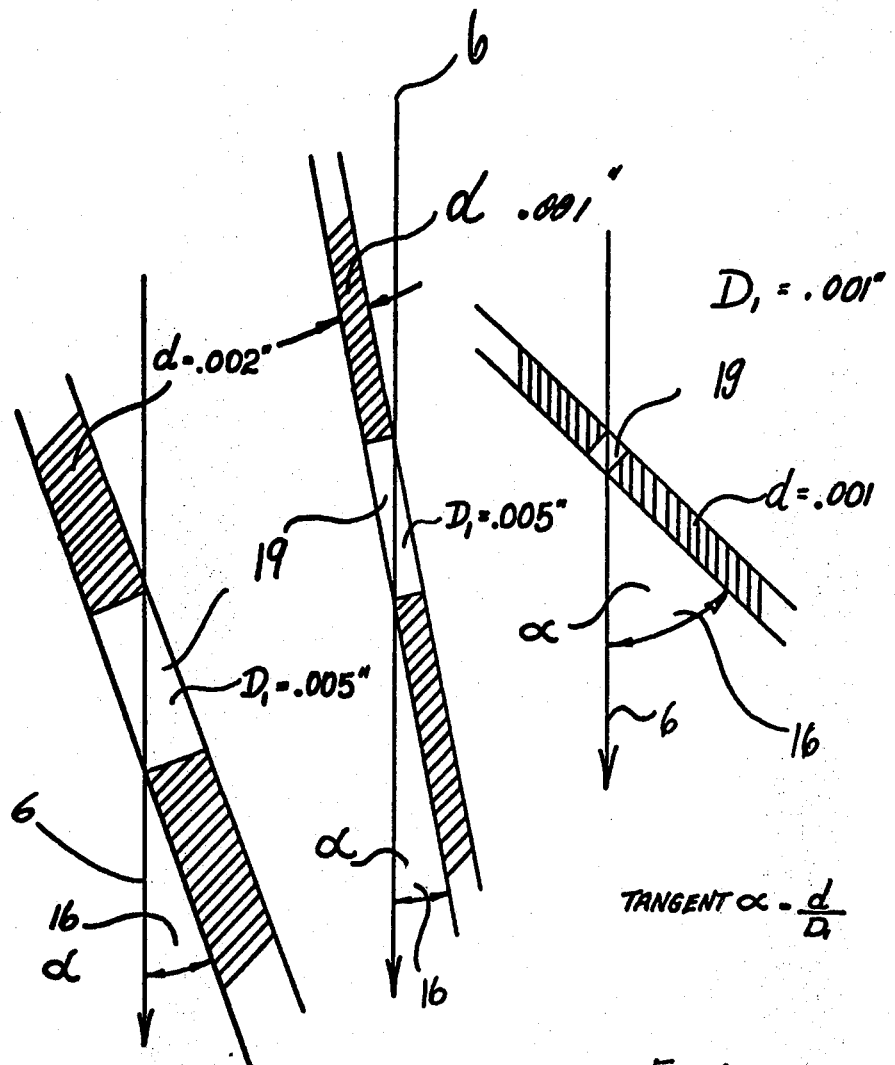
FIG. 4 is a diagram illustrating the relationship between thickness of sheet material, hole diameter and critical angle.

The critcal angle 16 or $\alpha$ is much affected by the diameter of the largest natural hole of the unblemished material and by the thickness of the sheet material. This is obvious from the three examples shown in FIG. 4. In this figure the critical angle 16 changes from 10 degrees to 45 degrees as function of diameter and thickness. The critical angle may be simply calculated: tangent $\alpha = d/D1$, i.e., thickness divided by hole diameter. Therefore, an important feature of the invention is the adjustment of the critical angle. For example, the two rollers 2 and 3 of FIG. 1 could be rotated about a pivot line or axis of rotation 23 formed where the axis 6 of beam 7 intersects section 17 of the sheet material.

When a lump or crease in the sheet material is passing over roller 2 or under roller 3 the critical angle is affected and therefore such defects will also modulate the photo-current of cell 9. This principle properly applied, using light in the visible range or the ultraviolet range, according to the inspection of sheet materials without or with holes, using the smallest (shallowest) critical angles and the smallest unsupported sections 17 illuminated, can be made quite sensitive for the detection of abnormal elevations such as lumps and creases. Therefore, this principle is a non-contacting system for the detection of holes and elevations in contradistinction to feeler type mechanical contacting detectors.

I claim:

1. A method of detecting by photoelectric sensors, blemishes in a sheet material which is an unblemished state has spaced apart apertures therein, which comprises illuminating said sheet material with a beam of light at an acute angle to the plane of said sheet material, the tangent of said angle being equal to or less than the number obtained by dividing the thickness of said material by the dimension, in the direction of the sheet flow, of the largest aperture in the unblemished sheet material.

2. A method as claimed in claim 1, wherein said sheet material is illuminated with ultraviolet light.

3. A method as claimed in claim 1, wherein said sheet material is illuminated with light in the visible range and the sheet material is substantially opaque to ultraviolet light.

4. A method as claimed in claim 1, wherein the light beam is a narrow beam in the direction of sheet flow.

5. A method as claimed in claim 1, wherein the light beam is formed of substantially parallel beams.

6. An apparatus for detecting blemishes in a sheet material which in an unblemished state has spaced apart apertures therein, comprising illuminating means, means for supporting at least a section of said sheet material in a planar condition, said illuminating means being arranged to direct a beam of light onto said planar section of sheet material and at an acute angle thereto, the tangent of said angle being equal to or less than the number obtained by dividing the thickness of said sheet material by the dimension, in the direction of the sheet flow of the largest apperature in the unblemished sheet material, photoelectric means for detecting light transmitted through said planar section, said angle being such that optimal sensitivity and a large signal to noise ratio is obtained for said photoelectric means.

7. An apparatus as claimed in claim 6 wherein said illuminating means comprises an ultraviolet light source.

8. An apparatus as claimed in claim 6 wherein said support means comprises two rollers and said sheet material is entrained over one of said rollers and under the other of said rollers to provide said planar section of said sheet material.

9. An apparatus as claimed in claim 6 wherein means are provided to move said material along a path defined by said planar section.

References Cited

UNITED STATES PATENTS

| 3,199,401 | 8/1965 | Sleighter et al. | 356—239 X |
| 3,359,853 | 12/1967 | Benson et al. | 250—219 X |
| 3,395,286 | 7/1968 | Brosious et al. | 250—219 |

WALTER STOLWEIN, Primary Examiner

C. M. LEEDOM, Assistant Examiner

U.S. Cl. X.R.

250—83.3; 356—200, 239